United States Patent [19]
Short et al.

[11] Patent Number: 6,109,170
[45] Date of Patent: *Aug. 29, 2000

[54] GARLIC PRESS WITH DETACHABLE CLEANER

[75] Inventors: Kevin G. Short, LaGrange; Leon C. Clouser, Jr., Lombard; David May, Geneva; Diane Subsits; Daiying Huang, both of Chicago, all of Ill.

[73] Assignee: The Pampered Chef, Ltd., Addison, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 09/144,844

[22] Filed: Aug. 31, 1998

[51] Int. Cl.[7] .............................. A47J 19/06; B30B 9/02; B30B 9/06; B30B 15/00
[52] U.S. Cl. .............................. 99/510; 99/495; 100/112; 100/125; 100/234; D7/666
[58] Field of Search ..................... 99/495, 506, 508–510, 99/511; 100/112, 125, 234, 99, 116, 243; 241/167, 169.1, 273.3, 169.2, 95; D7/665, 666

[56] References Cited

U.S. PATENT DOCUMENTS

| | | | |
|---|---|---|---|
| 253,353 | 2/1882 | Dean ........................................ | 100/234 |
| D. 279,754 | 7/1985 | Hansen ..................................... | D7/101 |
| D. 293,757 | 1/1988 | Pedrini ..................................... | D7/161 |
| D. 339,037 | 9/1993 | Gianpiero ................................. | D7/666 |
| D. 350,261 | 9/1994 | Ahner ....................................... | D7/666 |
| D. 364,999 | 12/1995 | Malinosky ............................... | D7/666 |
| D. 366,816 | 2/1996 | Laib ......................................... | D7/666 |
| 683,347 | 9/1901 | Smith ....................................... | 100/234 |
| 1,026,670 | 5/1912 | Goodnow ................................ | 100/234 |
| 1,054,731 | 3/1913 | Williams ................................. | 100/234 |
| 1,762,031 | 6/1930 | Roberts . | |
| 2,776,616 | 1/1957 | Sarossy .................................... | 100/234 |
| 3,327,621 | 6/1967 | Zysset ...................................... | 100/125 |
| 3,580,168 | 5/1971 | Zysset ...................................... | 100/234 |
| 4,069,752 | 1/1978 | Ahner ....................................... | 100/112 |
| 4,466,346 | 8/1984 | Gemelli .................................... | 100/112 |
| 4,537,123 | 8/1985 | Holcomb ................................. | 100/125 |
| 4,545,299 | 10/1985 | Ahner ....................................... | 100/112 |
| 4,714,205 | 12/1987 | Steinko .................................... | 241/95 |
| 5,101,720 | 4/1992 | Bianchi .................................... | 100/99 |
| 5,163,362 | 11/1992 | Gaber et al. ............................. | 99/495 |
| 5,165,335 | 11/1992 | Bianchi .................................... | 100/112 |
| 5,303,640 | 4/1994 | Gaber et al. ............................. | 99/495 |
| 5,370,044 | 12/1994 | Lackie ..................................... | 100/234 |
| 5,463,941 | 11/1995 | Gibson .................................... | 99/508 X |
| 5,467,699 | 11/1995 | Laib ......................................... | 99/495 |
| 5,513,562 | 5/1996 | Moor ....................................... | 100/112 |
| 5,520,104 | 5/1996 | Ancona et al. .......................... | 99/495 |
| 5,791,237 | 8/1998 | Gibson .................................... | 99/510 |
| 5,863,001 | 1/1999 | Schulze ................................... | 241/169 |

*Primary Examiner*—Timothy F. Simone
*Attorney, Agent, or Firm*—Olson & Hierl, Ltd.

[57] ABSTRACT

A manually operated, two lever arm type garlic press is provided which a detachably associated cleaning plate that is stored at the front end of the one of the lever arms (preferably, the first lever arm). The cleaning plate is provided with projections on its inner surface which are adopted to engage with apertures in the floor plate of the press chamber so as to clean debris from the apertures after usage of the garlic press. During storage, the projections extend forwardly from the associated lever arm. The cleaning plate is provided with opposing side clips and with top and bottom stabilizing legs that coact together and cooperate with side portions of the associated lever arm adjacent to the front end to hold the cleaning plate relative to that lever arm. Preferably, the top stabilizing leg also functions as a lock to retain the lever arms in a closed configuration during garlic press storage.

35 Claims, 2 Drawing Sheets

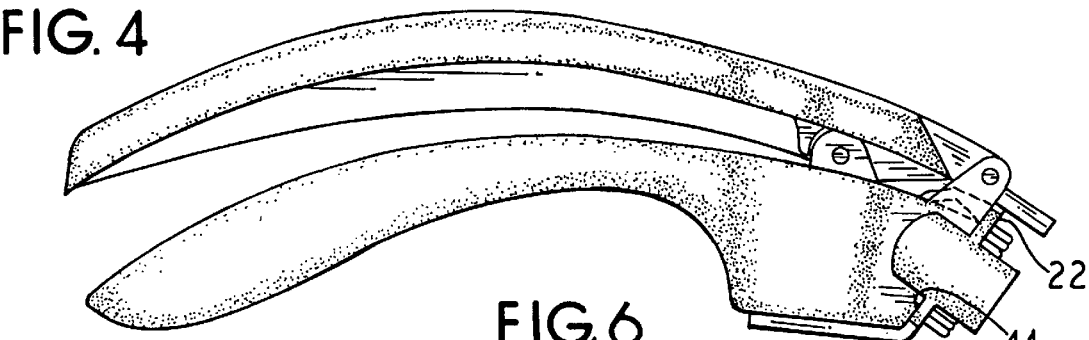
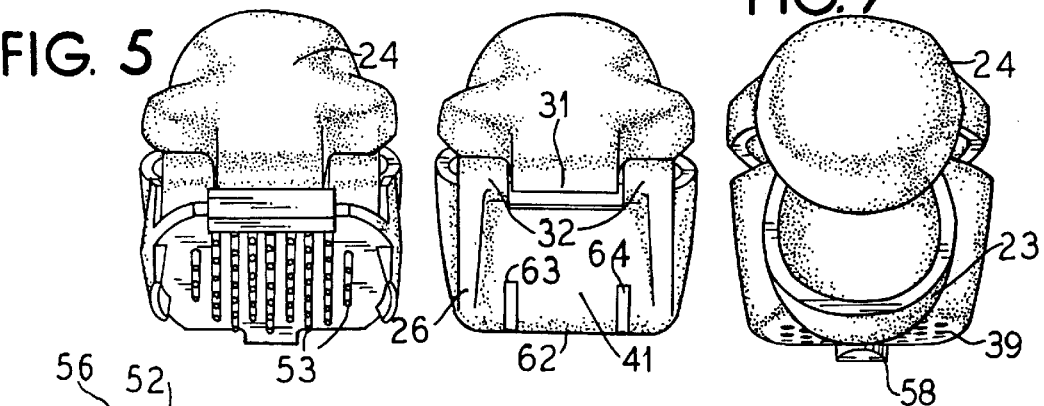
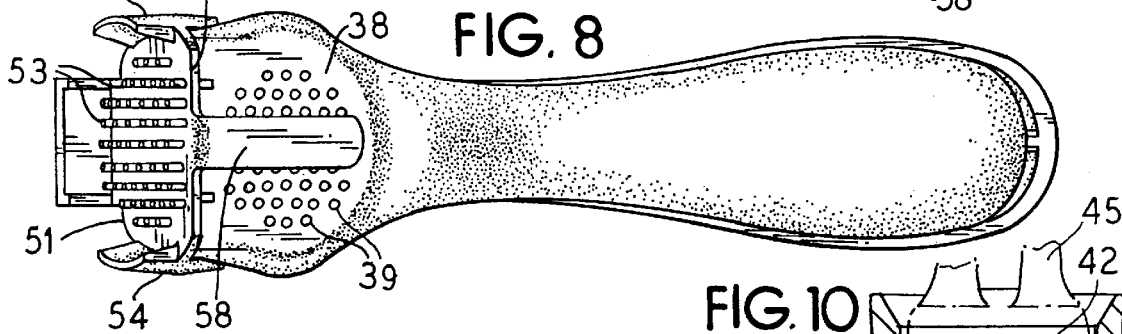
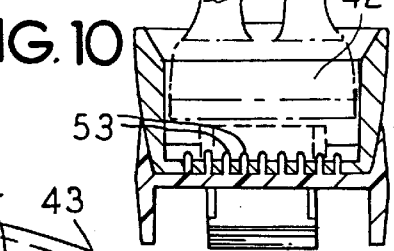
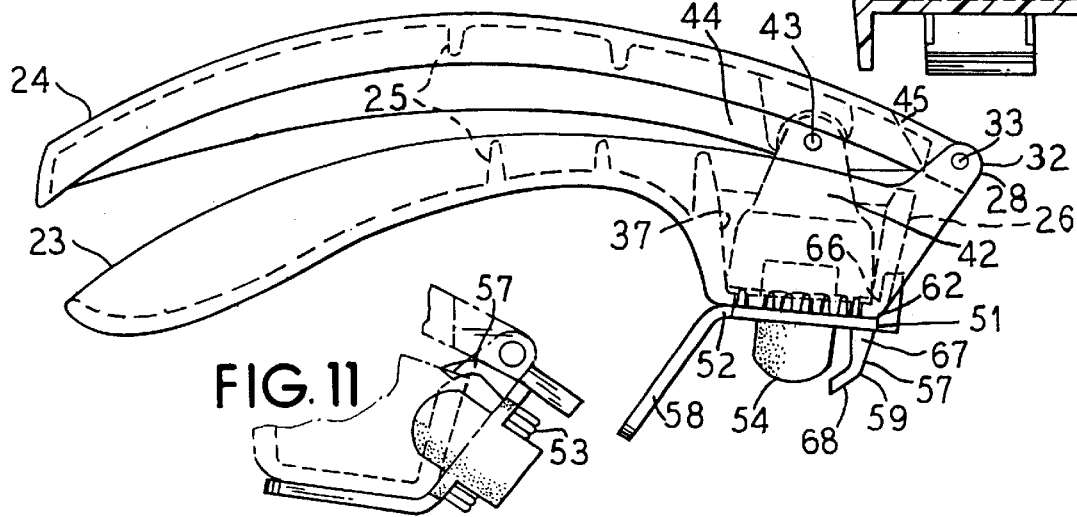

GARLIC PRESS WITH DETACHABLE CLEANER

FIELD OF THE INVENTION

This invention relates to manually operated, lever-type garlic presses that are equipped with a press plate cleaner.

BACKGROUND OF THE INVENTION

Although manually operated garlic presses are useful and effective, they are generally difficult to clean, which particularly involves the removal of the compressed clove from the apertures in the floor plate of the press chamber. In routine use, these apertures tend to become filled with the material from a garlic clove as it is squeezed in the press chamber between the floor plate and an anvil. The anvil compressively descends in the chamber towards the floor plate as the press levers are manually squeezed together by the user so that fluid and paste from the compressed clove can drain out through the floor plate apertures.

Attempts to flush out any remaining material from the apertures using tap water pressure are usually ineffective. Moreover, surface brushing of the floor plate usually does not clear all of the material from the apertures.

Prior art garlic presses have proposed using a cleaning plate with a plurality of spaced, upstanding or projecting pins or projections. The plurality of pins or projections would remove the remaining material or debris from the press floor plate apertures. Various adaptations of this concept have been proposed. However, so far as is known, these adaptations suffer from various drawbacks in that the resulting garlic press, particularly in association with some form of cleaning plate, tends to be cumbersome and unwieldy, and awkward to use, clean, and/or store.

The present invention provides an improved combination of a manually operated lever-type garlic press, associated cleaning plate and mutual interconnection means which reduces or overcomes these drawbacks.

SUMMARY OF THE INVENTION

More particularly, the invention relates to a new and useful combination of manually operated garlic press and cleaning plate. The press has upper and lower levers. The levers are pivotably associated at their front end regions. The lower lever also includes a cooperating cleaning plate at its front end region.

The combination provides a compact garlic press that is easily used, easily cleaned, and readily stored.

The inventive combination of lever type garlic press with cleaning plate provides an improvement over prior art combinations of lever-type garlic press with cleaning plate, and the inventive combination overcomes or minimizes the drawbacks of the prior art combinations.

In the inventive combination, the lower lever includes side walls and an apertured floor portion of a press chamber in its forward portion. The forward portion is provided with a lateral, continuously extending and preferably flattened exterior front end portion. Against this front end portion, the smooth outer, preferably matingly engagable, surface of a cleaning plate rests when the cleaning plate is in its storage position. The cleaning plate is held in this position by connector members. In this storage position, the aperture cleaning pins (or projections) that are provided on the opposed inner surface of the cleaning plate extend outwardly.

Although various connector members can be used, it is preferred the cleaning plate be provided with opposed side clips that removably engage the side portions of the lower lever adjacent to the front end portion. In addition, preferably the cleaning plate is provided with top and bottom stabilizer legs that are adapted to lie against adjacent front end portions of the lower lever when the cleaning plate is engaged with the lower lever front end.

When the cleaning plate is disengaged from the lower lever front end, it is turned around for positioning over the exterior press chamber floor portion. Preferably a locating flange is provided that is adjacent to the top side of the cleaning plate. This flange serves to locate and position the hooks over a matingly engagable forwardmost edge of the floor portion along the bottom of the front end portion of the lower lever. Preferably alignment lugs are also provided that engage locating grooves. When the cleaning plate inner surface is pivotally advanced against the outer surface of the floor plate, the pins of the cleaning plate are aligned with the apertures. The pins enter the apertures of the floor plate so that debris therein is pushed back into the press chamber for later disposition.

In the preferred embodiment the upper lever is associated with an anvil, in a pivotable manner. The anvil is adapted to reciprocatingly move in the press chamber after the anvil enters the open top of the press chamber, as the upper lever reciprocates and advances towards or retreats from the lower lever.

Preferably, the top leg of the cleaning plate, alone or with the anvil and press chamber, acts as a lock when the cleaning plate engages the lower leg front portion and/or the anvil engages the press chamber. Such engagement generally tends to prevent the upper lever from separating and pivotably moving away from the lower lever. This locking manner is desirable for keeping the garlic press in a closed configuration in a kitchen drawer or the like during storage of the garlic press.

Various other objects, aims, purposes, features, advantages, embodiments, variations and the like will be apparent to those skilled in the art from the teachings of the present specification taken with the associated drawings and the appended claims.

BRIEF DESCRIPTION OF THE DRAWINGS

In the drawings:

FIG. 4 is a right side elevational view (relative to FIG. 1) of the garlic press of FIG. 1 with the press cleaner in association with the garlic press front end;

FIG. 5 is a front end elevational view (relative to FIG. 1) of the garlic press of FIG. 1 depicting press cleaner in association therewith;

FIG. 6 is a front end elevational view similar to FIG. 5 with the press cleaner removed;

FIG. 7 is a back end elevational view (relative to FIG. 1) of the garlic press of FIG. 1;

FIG. 8 is a bottom plan view of the garlic press of FIG. 1 showing the press cleaner in association with the garlic press front end;

FIG. 9 is a right side view similar to FIG. 4 with the press cleaner engaging the apertures in the press plate with portions of the garlic press being shown in phantom;

FIG. 10 is a cross-sectional view through the garlic press hopper with the press cleaner engaging the press plate as shown in FIG. 9, some parts thereof being broken away;

FIG. 11 is a fragmentary partial longitudinal sectional view of the front end region of the garlic press as shown in FIG. 4 depicting the locking feature for the press cleaner;

DETAILED DESCRIPTION

Figure 1:
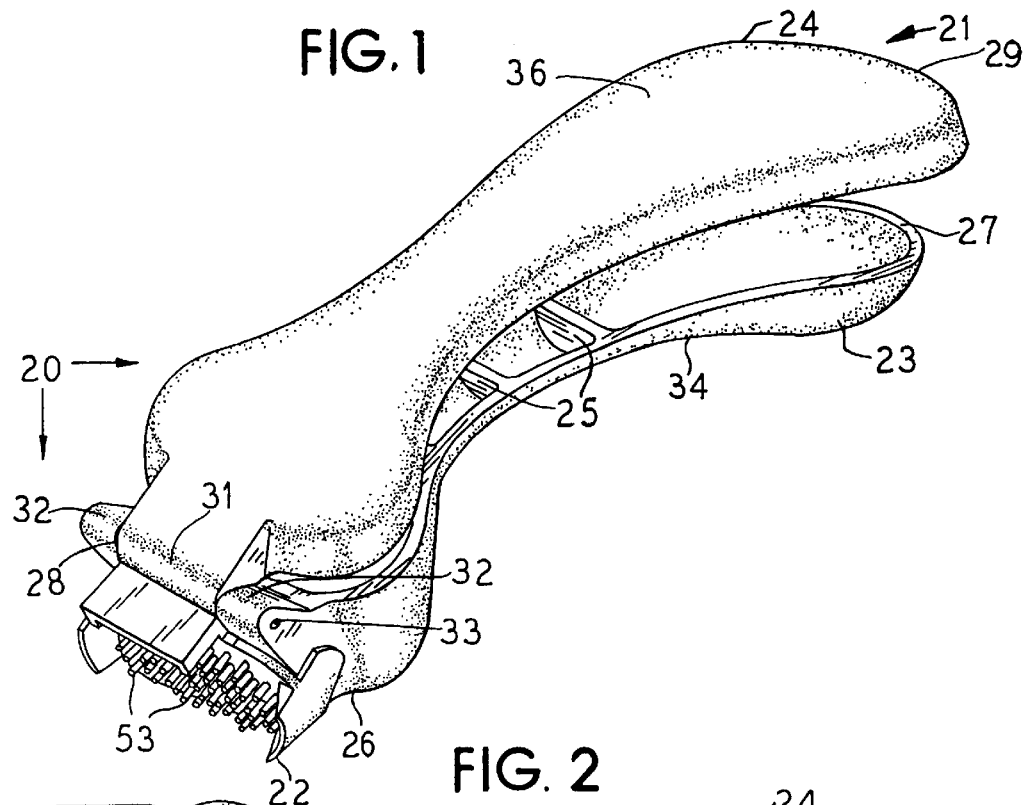
FIG. 1 is an perspective view of one embodiment of the inventive garlic press.

The present invention discloses a combination of a manually operated garlic press and cleaning plate that is both functional and aesthetically pleasing. The present garlic presser is capable of easily and readily compressing garlic cloves while the cleaning plate readily cleans and clears the apertures. Additionally, the cleaning plate includes an alignment means to ensure proper alignment of the pins with the apertures. Moreover, the present garlic press includes a lock to provide effective storage. Each component has further functional and aesthetic features which permit it to accomplish its several goals and objects.

While this invention is susceptible of embodiments in many different forms, this specification and the accompanying drawings disclose only some specific forms as examples of the invention. The invention is not limited to the embodiments described however. The scope of the invention is pointed out in the appended claims.

Referring to FIGS. 1–13, there is seen a preferred embodiment of the inventive combination 20 of a garlic press, generally designated 21, with a press plate cleaner (or cleaner plate), generally designated 22. The garlic press 21 includes a first or lower lever arm 23 and a second or upper lever arm 24. First lever arm 23 has a proximal end 26 and a distal end 27, while the second lever arm 24 has a proximal end 28 and a distal end 29. The proximal end 28 of second lever arm 24 includes a forwardly extending central leaf 31 that extends between a pair of laterally spaced, forwardly extending edge leaves 32 that are provided at the upper proximal end 26 of second lever arm 24. Leaf 31 is pivotably connected between the pair of forwardly extending edge leaves 32 by a laterally extending pivot pin 33 that extends through a continuous channel in leaves 32 and 31.

A hand grip portion 34 and 36 is provided on each lever arm 23 and 24, adjacent to each of the distal ends 27 and 29. The first and second lever arms 23 and 24 are each conveniently comprised of molded metal (preferred) or molded plastic. In one embodiment, first and second lever arms 23 and 24 are comprised of stainless steel. As an alternative to the stainless steel, any known material typically used in the manufacture of cutlery, such as, for instance, aluminum, aluminum alloys, steel alloys, or other metals or alloys, may be used. Moreover, the concavely curved interior regions of each lever arm 23 and 24 are preferably provided with reinforcing ribs 25.

Figure 3:
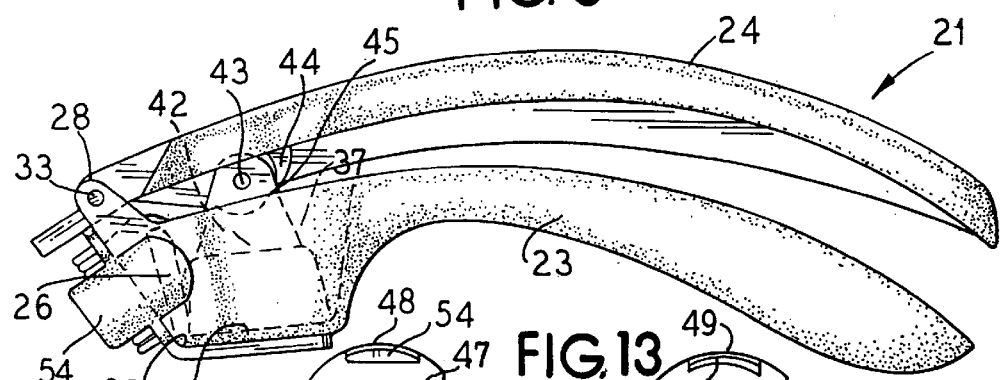
FIG. 3 is a left side elevational view (relative to FIG. 1) of the garlic press of FIG. 1.

The first lever arm 23 has an upwardly opening press chamber 37 defined therein adjacent the proximal end 26 thereof (best seen in FIGS. 3 & 9). The press chamber 37 has a floor portion 38 that preferably has flat, spaced, parallel inner and outer surfaces. A plurality of apertures 39 are defined through the floor portion 38 in a patterned array (best seen in FIG. 8).

The first lever arm 23 has a continuously extending front facial portion 41 (best seen in FIG. 4) defined at the proximal end 26 below the leaves 32. In the depicted embodiment the front facial portion 41 is flat although various surface configurations could be employed if desired. The top region of front facial portion 41 is forward of the lower region thereof (that is the front facial portion is forwardly inclined).

Figure 2:
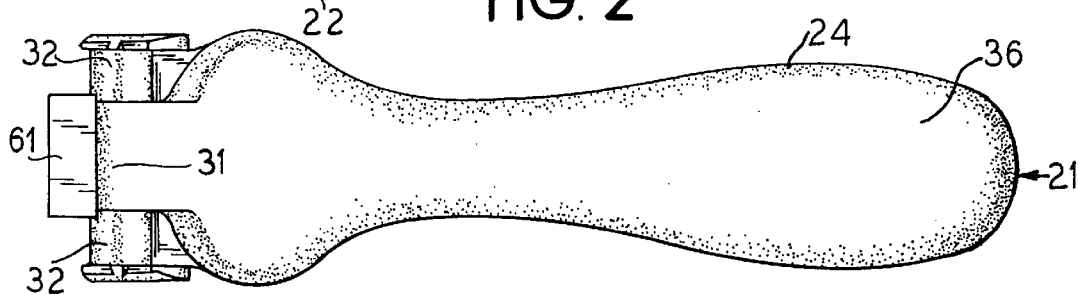
FIG. 2 is a top plan view of the garlic press of FIG. 1.

Turning now to FIG. 2, the second lever arm 24 is shown having a downwardly depending anvil member 42 extending from an underside region thereof that is adjacent to, but here spaced longitudinally from, proximal end 28. Various connection means can be used to connect the anvil member 42 with second lever arm 24. Alternatively the anvil member 42 can be unitarily formed with the second lever arm 24, as those skilled in the art will readily appreciate.

Preferably, anvil member 42 is solid, separately molded component comprised of metal, such as for instance, stainless steel, aluminum, aluminum alloy, steel alloy, or other metals or alloys, and has a bell-shaped configuration when viewed from the side. The upper end of anvil member 42 is pivotably connected to the lower side of second lever arm 24 by means of a laterally extending pivot pin 43.

From FIG. 3 it can be seen that pin 43 extends through both an ear 44 that is centrally located and integrally formed with the second lever arm 24 on the inside thereof and through a pair of ears 45 on the upper end of the anvil member 42 that are located on each side of the ear 44. The anvil member 42 is adapted to reciprocatingly move up and down in the press chamber 37 when the lever arms 23 and 24 are articulated relative to one another about the pivot pin 33. The anvil member 42, owing to its pivotal adjustability about pivot pin 43 relative to second lever arm 24, is, in effect self-adjusting in orientation relative to press chamber 37.

In operation, a garlic clove (not shown) in the press chamber 37 is squeezed between the head (or bottom) face of anvil member 42 and the inside face of the floor portion 38 when the arms 23 and 24 are manually brought together. Fluid is extruded from the clove which exits through the apertures 39.

Figures 12, 13:
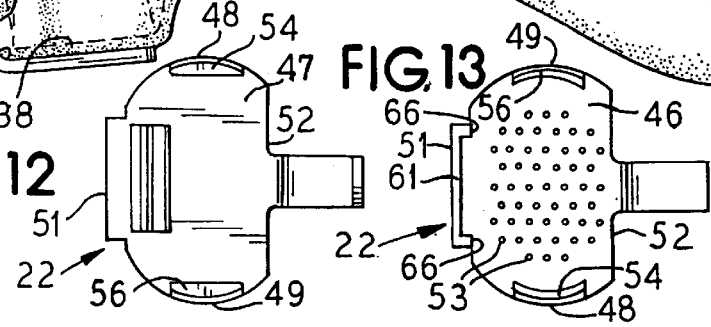
FIG. 12 is a bottom plan view of the press cleaner.
FIG. 13 is a top plan view of the press cleaner.

Cleaner plate 22 is best understood be reviewing FIGS. 12 & 13. The cleaner plate 22 has generally opposed inner and outer faces 46 and 47, respectively, that are preferably flat. Plate 22 has opposed side portions 48 and 49, and opposed top end and bottom end portions 51 and 52 respectively.

Inner face 46 is preferably adapted for interfacial contacting engagement with the outside surface of the floor portion 38. The inner face 46 is provided with a plurality of upstanding or projecting pins or projections 53 that are ordered correspondingly to the array of apertures 39. In this manner each of the projections 53 can be inserted into and engage a different one of the apertures 39 when the inner face 46 engages the outside surface of the floor portion 38. Thus, debris in the apertures 39 is displaced inwardly towards the press chamber 37 for subsequent disposition.

The outer face 47 is preferably configured for interfacial engaging the regions of the front facial portion 41. While it is preferred that outer face 47 is flat, other configurations are contemplated. The perimeter of the cleaner plate 22 is provided with a preferably integrally formed clip member 54 and 56, respectively along each of the opposed sides 48 and 49. Each clip member 54 and 56 has a lateral arcuate configuration and upstands or projects from each face 46 and 47.

Grasping and clamping the projecting portions of each clip member 54 and 56 adjacent to the inner face 46 causes these projecting portions to yieldingly spread apart. Spreading the projecting portions of each clip member 54 and 56 apart makes possible the convenient and easy engagement of these portions with respective adjacent side portions of the second lever arm 24 that are adjacent to the front facial portion 41. Various connector means for releasably connecting the press plate cleaner 22 to the front facial portion 41 can be employed, and various clip configurations and arrangements can be employed, as those skilled in the art will readily appreciate.

FIGS. 9 & 10 reveal a stabilizing leg 57 at, and preferably integral with, the top end 51, and a stabilizing leg 58 at, and preferably integral with, the bottom end 52. Stabilizing legs 57 and 58 of press plate cleaner 22 coact with the clip members 54 and 56 and aid in stabilizing the connection between plate cleaner 22 and front facial portion 41. As depicted, the stabilizing leg 58 is relatively narrow and elongated and is configured to engage and extend across a mid-portion of the outer face of the floor portion 38.

The stabilizing leg 57 is shorter here than leg 58 and is provided with a fixed medial bend or knee 59 defining an upper or thigh portion 67 and a lower leg portion 68. The thigh portion 67 has an upper region engaging a lower side portion of the second lever arm 24 that is adjacent to the proximal end 28 thereof (best seen in FIG. 4). The outer heel or foot region of leg portion 68 rests against an upper interior side portion of the first lever arm 23 in spaced, adjacent relationship to the proximal end 26 thereof.

An adjacent upwardly projecting (reactive to leg 57) portion of plate cleaner 22 is here preferably adapted to make contacting engagement on one face thereof with the proximal end 28 of second lever arm 24. The result is that the plate 22 and the leg 56 function to lock the arms 23 and 24 when plate 22 is associated with front facial portion 41, and to restrain pivotal movements thereof.

The press plate cleaner 22 is additionally provided with a locating flange 61 positioned along the top end 51 of plate cleaner 22 and which upstand or projects here perpendicularly from inner face 46. Flange 61 thus projects oppositely from the clips 54 and 56 and the legs 57 and 58. In second lever arm 24, the outer face of the floor portion 38 and the front facial portion 41 preferably adjoin and define a generally straight corner edge 62. When the inner face 46 of the cleaning plate 22 engages the outside surface of the floor portion 38 after separation of the cleaning plate 22 from the front facial portion 41, the locating flange 61 is positionable along the corner edge 62 and orients and positions the cleaning plate relative to the floor portion 38.

To improve the locating and seating of the press plate cleaner 22 against the outside face of the floor portion 38, the front facial portion 41 is preferably provided with a pair laterally spaced, traversely elongated grooves 63 and 64 that are located adjacent to the corner edge 62. The inner face 46 adjacent to flange 61 is provided with a pair of detents or lugs 66. Each lug 66 is configured to matingly engage a different one of the grooves 63 and 64. The engaged combination of grooves 63 and 64, detents 66, flange 61 and corner edge 62 cooperate to provide flange means that aligns the pins 53 with the apertures 39.

If desired, portions of the garlic press 21, such as the arms 23 and 24, and even the press plate cleaner 22, can be coated. Non-adhering coating such as polytetrafluoroethylene or the like are contemplated, using coating procedures known in the art.

Use of the Garlic Press and the Press Plate Cleaner

It will be appreciated that in using the garlic press 21, the press plate cleaner 22 should be separated therefrom. Grasping and clamping the projecting portions of each clip member 54 and 56 adjacent to the outer face 47 causes these projecting portions to spread apart. Spreading the projecting portions apart makes possible the convenient and easy disengagement of these portions with the second lever arm 24.

In pressing operation, a garlic clove (not shown) is placed in the press chamber 37. The garlic clove is squeezed between the head (or bottom) face of anvil member 42 and the inside face of the floor portion 38 when the arms 23 and 24 are manually brought together. Fluid is extruded from the clove which exits through the apertures 39.

In cleaning operation, grasping and clamping the projecting portions of each clip member 54 and 56 adjacent to the inner face 46 causes the projecting portions to spread apart. Spreading the projecting portions apart makes possible the convenient and easy engagement of these portions with the second lever arm 24.

Inner face 46 engages the outside surface of the floor portion 38 so that the plurality of upstanding pins or projections 53 are ordered correspondingly to the array of apertures 39. In this manner each of the projections 53 can be inserted into and engage a different one of the apertures 39. Further, the engaged combination of grooves 63 and 64, detents 66, flange 61 and corner edge 62 cooperate to provide flange means that aligns the pins 53 with the apertures 39. Thus, debris in the apertures 39 is displaced inwardly towards the press chamber 37 for subsequent disposition.

By virtue of the present invention, the described objectives are met. The present invention discloses a combination 20 garlic press 21 and press plate cleaner 22 that is both functional and aesthetically pleasing. The combination provides a compact garlic press 21 that is easily used, easily cleaned, and readily stored.

The foregoing illustrates the general principles of this invention. However, since numerous modifications and changes will be readily apparent to those skilled in the art based on this description, it is not desired to limit the invention to the exact construction and operation shown and described. Accordingly, the scope of this invention includes other modifications and equivalents that fall within the scope of the foregoing description and the following claims.

What is claimed is:

1. A garlic press comprising:
   first and second lever arms pivotably interconnected together by a connector means;
   said first arm having a press chamber with an apertured floor portion defined therein;
   said second arm having a means for extruding fluid extending moving in said press chamber responsive to movements of said first and second lever arms;
   a cleaning plate having an inner face and perimeter portions, said inner face being adapted for engaging said floor portion and having a plurality of upstanding pins arranged for individual association with respective ones of said floor portion apertures; and
   a means for releasably connecting said cleaning plate to portions of said first arm.

2. The garlic press of claim 1 wherein said first arm includes a front facial portion.

3. The garlic press of claim 2 wherein said releasable connecting means releasably connects said cleaning plate to said portions of said first arm adjacent to said front facial portion.

4. The garlic press of claim 3 wherein said cleaning plate includes an outer face opposite said inner face and adapted for engaging outside regions of said front facial portion.

5. The garlic press of claim 4 wherein said releasable connecting means releasably connects said perimeter portions of said cleaning plate to said portions of said first arm adjacent said front facial portion when said outer face engages said front facial portion outside regions.

6. The garlic press of claim 1 wherein said connector means comprises a pivot pin.

7. The garlic press of claim 6 wherein said first and second arms are pivotably interconnected together at one pair of respective adjoining end portions.

8. The garlic press of claim 7 wherein said extruding means extends into and reciprocally moves in said press chamber.

9. The garlic press of claim 8 wherein said press chamber is upwardly opening and adjacent said adjoining end portions.

10. The garlic press of claim 9 wherein said extruding means downwardly depends from said second arm and extends into and reciprocally moves in said press chamber.

11. The garlic press of claim 1 wherein said inner face is adapted for engaging an outside region of said apertured floor portion.

12. The garlic press of claim 2 wherein said front facial portion extends generally laterally and continuously at one pair of respective adjoining end portions of said first and second arms.

13. The garlic press of claim 12 wherein said floor portion and said front facial portion adjoin and define a corner region and wherein said cleaning plate additionally includes a flange means configured to matingly engage said corner region whereby said corner region and said flange means cooperate to orient said cleaning plate for interconnection of said pins with said floor portion apertures.

14. The garlic press of claim 13 wherein said flange means projects from said inner face.

15. The garlic press of claim 2 wherein said releasable connecting means includes at least two projecting clips, each one being on a different opposed side regions of said perimeter and configured to associate with respective portions of said first arm adjacent to said front facial portion.

16. The garlic press of claim 15 wherein said releasable connecting means further includes at least two stabilizer legs, each one being on a different opposed end region of said perimeter and being configured to associate with respective portions of said first arm adjacent to said front facial portion.

17. The garlic press of claim 16 wherein one of said stabilizer legs is additionally adapted to adjoin a portion of said second arm whereby said first and second lever arms are restrained from pivotably separating when said cleaning plate engages said front facial portion regions.

18. A manually operated, lever-type garlic press comprising in combination:

first and second elongated lever arms, each having respective proximal and distal end regions and a hand grip portion adjacent said distal end region;

connector means pivotably interconnecting said first and second lever arms;

said first arm having a press chamber defined therein, said press chamber having a floor portion with a plurality of apertures defined therethrough, and said first arm having a front facial portion;

said second arm having a means for extruding fluid connected thereto, said extruding means being adapted to move in said press chamber when said first and second lever arms are articulated about said pivot pin means, whereby a garlic clove in said press chamber is squeezable between said extruding means and said floor portion so that fluid extrudate from said clove is drainable through said apertures;

a cleaning plate having generally opposed inner and outer faces, said inner face being configured to engage said floor portion and having a plurality of upstanding pins defined thereon and ordered for individual association with respective ones of said apertures when said inner face engages said floor portion, whereby debris in said apertures is thereby displaced; and said outer face configured for engaging regions of said front facial portion.

19. The garlic press of claim 18 wherein said connector means comprises a pivot pin pivotably interconnecting said first and second lever arms.

20. The garlic press of claim 19 wherein said front facial portion is exteriorly defined at said proximal end region of said first arm.

21. The garlic press of claim 20 wherein said extruding means is adapted to reciprocatingly move in said press chamber.

22. The garlic press of claim 21 wherein said inner face is configured to engage an outside surface region of said floor portion.

23. The garlic press of claim 22 wherein said cleaning plate includes opposed side portions and opposed top and bottom portions.

24. The garlic press of claim 18 wherein said cleaning plate further includes said opposed side portions each having a projecting clip and each of said top and bottom end portions having a projecting leg member, whereby, when said outer face engages said front facial portion regions, each one of said clip is adapted for association with a different opposing side portion of said first arm adjacent to said front facial portion, each of said bottom end portion leg members contacts regions of said floor portion, and each of said top end portion leg members contacts a top portion of said first arm adjacent to said proximal end region thereof.

25. The garlic press of claim 24 wherein said press chamber is defined upwardly opening adjacent said proximal end region of said second arm.

26. The garlic press of claim 25 wherein said extruding means downwardly depends from and is pivotably connected adjacent said proximal end region of said second arm.

27. The garlic press of claim 26 wherein said facial portion extends continuously and generally laterally across said proximal end region of said first arm below said pivot pin means.

28. The garlic press of claim 18 wherein said floor portion and said front portion adjoin and define a generally straight corner region.

29. The garlic press of claim 28 wherein said cleaning plate additionally includes locating flange means adjacent to said top end portion and which projects upwards relative to said inner face, whereby when said cleaning plate engages said floor portion outside surface region, said locating flange means is positionable adjacent said straight corner region and orients said cleaning plate relative to said floor portion.

30. The garlic press of claim 29 wherein said locating flange means includes at least one lug which cooperatively engages at least one groove.

31. The garlic press of claim 24 wherein said top end portion leg member additionally adjoins said second arm whereby said first and second lever arms are restrained from pivotably separating when said cleaning plate engages said front facial portion.

32. The garlic press of claim 27 wherein said outside surface region of said floor portion, said front facial portion, and said inner and outer faces of said cleaning plate are flattened.

33. The garlic press of claim 27 wherein said extruding means is an anvil pivotally connected to said second arm.

34. The garlic press of claim 27 wherein said first and second lever arms are each comprised of a molded metal and said cleaning plate and said pins, said clips, and said leg members are integrally formed of a molded plastic.

35. The garlic press of claim 34 wherein said first and second lever arms are each coated with polytetrafluoroethylene.

* * * * *